(12) United States Patent
Newton et al.

(10) Patent No.: US 8,712,948 B2
(45) Date of Patent: Apr. 29, 2014

(54) METHODS AND SYSTEMS FOR ADAPTING A USER ENVIRONMENT

(75) Inventors: Philip Steven Newton, Eindhoven (NL); Henricus Fransiscus Petrus Maria Van Doveren, Eindhoven (NL); Dirk Brokken, Eindhoven (NL); Jacobus Maria Antonius Van Den Eerenbeemd, Eindhoven (NL); Floris Maria Hermansz Crompvoets, Eindhoven (NL); Paul Marcel Carl Lemmens, Eindhoven (NL); Jan Johannes Gerardus De Vries, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 214 days.

(21) Appl. No.: 13/264,058

(22) PCT Filed: Apr. 8, 2010

(86) PCT No.: PCT/IB2010/051520
§ 371 (c)(1),
(2), (4) Date: Oct. 12, 2011

(87) PCT Pub. No.: WO2010/119376
PCT Pub. Date: Oct. 21, 2010

(65) Prior Publication Data
US 2012/0041917 A1   Feb. 16, 2012

(30) Foreign Application Priority Data
Apr. 15, 2009   (EP) .................................. 09157915

(51) Int. Cl.
*G06F 17/00*   (2006.01)

(52) U.S. Cl.
USPC ................................ 706/46; 706/23

(58) Field of Classification Search
USPC ............................................ 706/46
See application file for complete search history.

(56) References Cited

U.S. PATENT DOCUMENTS 5,875,108 A * 2/1999 Hoffberg et al. ............ 700/17
6,001,065 A * 12/1999 DeVito ...................... 600/544

(Continued)

FOREIGN PATENT DOCUMENTS

WO   02092184 A1   11/2002
WO   03089100 A1   10/2003

OTHER PUBLICATIONS

Poppe et al: "Interoperable Affective Context Collection Using MPEG-21"; Proc. International Conference on Wireless, Mobile & Multimedia Networks, ICWMMN 2006, 4 Page Document.

(Continued)

*Primary Examiner* — Jeffrey A Gaffin
*Assistant Examiner* — David H Kim

(57) ABSTRACT

A method of adapting an environment of a terminal (2) includes: —receiving data (27) from an external source at the terminal (2); —receiving monitoring data from a system for monitoring at least one user in the environment; and —controlling at least one output device for providing an output perceptible in the environment, the output being adjusted in dependence on the monitoring data. At least one segment including data pertaining to at least one mental state is retrieved from the data (27) from the external source, and the adjustment in dependence on the monitoring data is effected at least partly on the basis of the data pertaining to the at least one mental state.

13 Claims, 3 Drawing Sheets

(56) References Cited

U.S. PATENT DOCUMENTS

| | | | |
|---|---|---|---|
| 6,611,206 B2 * | 8/2003 | Eshelman et al. | 340/573.1 |
| 2004/0229685 A1 | 11/2004 | Smith et al. | |
| 2005/0223237 A1 | 10/2005 | Barletta et al. | |
| 2010/0123588 A1 * | 5/2010 | Cruz Hernandez | 340/573.1 |
| 2011/0137137 A1 * | 6/2011 | Shin et al. | 600/301 |
| 2011/0190913 A1 * | 8/2011 | Van De Sluis et al. | 700/94 |
| 2011/0207100 A1 * | 8/2011 | Brokken et al. | 434/236 |
| 2011/0295392 A1 * | 12/2011 | Cunnington et al. | 700/90 |
| 2012/0296476 A1 * | 11/2012 | Cale et al. | 700/276 |
| 2013/0121591 A1 * | 5/2013 | Hill | 382/195 |

OTHER PUBLICATIONS

Multimedia Description Schemes (MDS) Group: "MPEG-7 Multimedia Description Schemes XM (Version 7.0)"; ISO/IEC JTC 1/SC 29/WG 11/N3964, Mar. 2001, Singapore, 115 Page Document.

* cited by examiner

METHODS AND SYSTEMS FOR ADAPTING A USER ENVIRONMENT

FIELD OF THE INVENTION

The invention relates to a method of adapting an environment of a terminal, including:
receiving monitoring data from a system for monitoring at least one user in the environment.

The invention also relates to a system for adapting an environment of a terminal, including:
an interface for receiving monitoring data from a system for monitoring at least one user in the environment.

The invention also relates to a method of influencing an environment of a terminal, including:
the terminal being arranged to receive monitoring data from a system for monitoring at least one user in the environment.

The invention also relates to a system for influencing an environment of a terminal, configured to provide data for delivery to the terminal,
the terminal being arranged to receive monitoring data from a system for monitoring at least one user in the environment.

The invention also relates to a signal, and a computer program.

BACKGROUND OF THE INVENTION

US 2005-0223237 A1 discloses an emotion-controlled system for processing multimedia data. It comprises a multimedia system for presenting multimedia content to the user, an emotion model means for determining the emotional state of the user during the presentation of the multi-media content and an editing unit for changing the multimedia content in accordance with the emotional state of the user in order to present the changed multimedia content by the multimedia system. The multimedia system may comprise not only display and loudspeakers but also other environmental devices such as lights or the like. According to the user's emotional state, a home entertainment system might receive and process emotion information and adapt the environment to such stimuli. If, for example, the user is watching a scary movie and the physical changes related to fear, such as a high heart beat rate or high blood pressure are submitted to the emotion model means and then afterwards the emotional state of fear is submitted to the editing means, then the multimedia system may adapt the environment by dimming down the light or increasing the sound in order to emphasize the emotion felt by the user.

A problem of the known system is that the user might not be particularly scared by the movie on its own, so that the environment is never adapted to emphasize such an emotion.

SUMMARY OF THE INVENTION

It is an object of the invention to provide methods, systems, a signal and a computer program of the types mentioned above, that allow the provider of content such as entertainment material to provide a user with an immersive experience with relatively few incongruencies.

This object is achieved by the method according to the invention, which includes:
receiving data from an external source at the terminal;
receiving monitoring data from a system for monitoring at least one user in the environment; and
controlling at least one output device for providing an output perceptible in the environment, the output being adjusted in dependence on the monitoring data,
wherein at least one segment including data pertaining to at least one mental state is retrieved from the data from the external source, and the adjustment in dependence on the monitoring data is effected at least partly on the basis of the data pertaining to the at least one mental state.

Because monitoring data is received from a system for monitoring at least one user in the environment and at least one output device for providing an output perceptible in the environment is controlled such that the output is adjusted in dependence on the monitoring data, a form of closed-loop control can be implemented at the terminal. Because the adjustment is effected in dependence on the monitoring data at least partly on the basis of data pertaining to the at least one mental state, the closed-loop control is effected such as to arrive at a target mental state. Because the terminal receives data and retrieves from the data at least one segment including the data pertaining to at least one mental state the target mental state is provided externally. In particular, it can be provided by an author of content data. Thus, the terminal adapts the outputs to achieve a target mental state that the author has instructed it to. A remote author can thus provide an appropriate immersive experience.

In an embodiment, the data from an external source comprises a data stream.

This embodiment has the effect that the target mental state can vary over time, as the data stream is received and parsed at the terminal.

In an embodiment, the data pertaining to at least one mental state includes data carrying information from which the dependency between the monitoring data and the output is at least partly derivable.

An effect of this feature is that the terminal is provided with the information on the control algorithm to implement to achieve a target mental state based on the monitoring data. Thus, the terminal need not be provided with an elaborate model of a user. More in particular, the terminal need not be provided with models and algorithms for achieving every one of a wide range of emotional states. Instead, it is provided by an external source with that data needed to achieve the target emotional state intended by the remote author of the immersive effects. This allows the use of a terminal with at least less memory. Moreover, it means that the author need not take account of different models that might otherwise be present in different types of terminals. Also, the external author can incorporate the latest insights into how to influence moods and what relations exist between moods and physiological or behavioral phenomena in the data provided by him. Thus, there is less need to rely on separate updates of such models and relations programmed in terminals already in use.

In an embodiment, the data pertaining to at least one mental state includes data representative of a boundary value of an allowable range of values of at least one signal obtainable from the monitoring data, and the adjustment of the output is carried out such as to keep values of the signal obtainable from the monitoring data within the allowable range of values.

This feature allows one to calibrate terminals, in the sense that the terminal can never implement a model of the user or of the relation between mental state and physiological or behavioral symptoms that results in excessive values of parameters characterizing such symptoms.

In an embodiment, segments including data pertaining to at least one mental state are received in synchrony with content data for rendering in at least one of a visible and an audible manner at the terminal, and the adjustment of the output perceptible in the environment is synchronized with a rendering of the content data at the terminal.

This embodiment allows an author of content data for rendering in at least one of a visible and an audible manner to provide an accompanying stream of data for adapting the viewing or listening environment to achieve a mental state of the viewer or listener that is appropriate to the content. More particularly, this mental state can change as the audio and video progress, e.g. the feelings engendered by the film's plot change from a state of suspense to a state of relief.

An embodiment includes receiving at least one segment of the data from the external source including data representative of aspects of the perceptible output to be adjusted, and modifying the data representative of aspects of the perceptible output to be adjusted based on the data pertaining to the at least one mental state in dependence on the monitoring data.

This embodiment allows an author to specify how a particular mental state is to be arrived at. For example, the author can specify that a scared state is to be achieved by adjustment of air currents generated by a fan or by adjustment of haptic effects generated by a force feedback device. In particular where the data stream is provided to accompany audiovisual content to be rendered, this can be useful in that the scared state might be preferably achieved using the former modality when the video depicts a windy scene or using the latter modality when the video depicts a marching army or the like.

In a variant of this embodiment, the data representative of aspects of the perceptible output to be adjusted is further modified on the basis of data representative of capabilities of at least one of the terminal and the output devices controllable by the terminal.

This variant ensures that the data stream can be handled by a relatively wide range of terminals and output devices controlled by such terminals. The data representative of capabilities of at least one of the terminal and the output devices controllable by the terminal may include rules for replacement of instructions contained in the data representative of aspects of the perceptible output to be adjusted or it may lead to certain instructions being ignored.

An embodiment of the method includes receiving data from an external source including both segments including the data representative of aspects of the perceptible output to be adjusted and segments including the data pertaining to the at least one mental state, and separating the respective segments from each other.

This embodiment further widens the range of terminals and decoders comprised in such terminals that can handle the data stream, in that those terminals that do not receive monitoring data can still control output devices. In that case, they would use only the data representative of aspects of the perceptible output to be adjusted. Moreover, the separation of the data allows for the data segments to be provided in simpler formats than would be the case if a single data container were to indicate both the emotional state to be achieved—and how— and the output modalities to be used. Such a container would need to come with elaborate case-statements, which would be relatively difficult for a simple decoder to parse.

In a variant, the data from the external source comprises a data stream, and the separation is effected by demultiplexing the data stream to retrieve separately identifiable data packets including the data representative of aspects of the perceptible output to be adjusted and data packets including the data pertaining to the at least one mental state.

This variant has the effect that synchronization of the segments is relatively easy to achieve. Moreover, especially where the data streams are transmitted, e.g. broadcast or multicast, over a network, the retrieval of the segments at the terminal is made easier.

In a further method of adapting an environment of a terminal that includes:

receiving data from an external source at the terminal;

receiving monitoring data from a system for monitoring at least one user in the environment; and controlling at least one output device for providing an output perceptible in the environment, the output being adjusted in dependence on the monitoring data, wherein the at least one segment including data pertaining to at least one mental state is retrieved from the data from the external source, and the adjustment is effected in dependence on the monitoring data at least partly on the basis of the data pertaining to the at least one mental state, a closed-loop control system is used. A feedback loop of the control system includes a model for classifying a mental state of at least one user based on the monitoring data. The mental state is classified as a set of values in N-dimensional space, wherein $N \geq 1$.

This has the effect that a suitable control variable is provided. One can derive an error signal by subtracting the model output from the target value.

In a variant of this embodiment, the adjusted output includes a rendering of at least one of audio, video, image, tactile feedback, olfactory and gustatory data, the adjustment including selection of the data to be rendered as perceptible output from a collection of available data.

In this variant, the mood of a user can be influenced comprehensively through selection of all perceptible outputs. Moreover, the collection of available data can be provided in advance.

Where the data to be rendered is selected, the control system can include a discrete controller.

Thus, discrete outputs that remain selected for a while are provided, in order to give the user time to take in the changed output. Especially in the case of cognitive data, the monitoring data will not show a very quick response to changed output.

Alternatively, where output is adjusted in dependence on the monitoring data by changing settings of an output device regulating how output is rendered in perceptible form, the control system can comprise a continuous controller.

Thus, for example, the volume of sound reproduction can be controlled continuously. It will thus not remain too loud for a longer time, but be turned down almost as soon as an inference has been made that the user has become too agitated, for example.

According to another aspect, the system for adapting an environment of a terminal according to the invention includes:

an interface for receiving data from an external source at the terminal;

an interface for receiving monitoring data from a system for monitoring at least one user in the environment; and a device for controlling at least one output device for providing an output perceptible in the environment, wherein the system is configured to cause the output to be adjusted in dependence on the monitoring data, and the system is configured to retrieve from the data from the external source at least one segment including data pertaining to at least one mental state, and to effect the adjustment in dependence on the monitoring data on the basis of the data pertaining to the at least one mental state.

In an embodiment, the system is configured to carry out a method according to the invention.

According to another aspect, the method of influencing an environment of a terminal according to the invention includes:

providing data to the terminal, the terminal being arranged to receive monitoring data from a system for monitoring at least one user in the environment, wherein the terminal is arranged to control at least one output device for providing an output perceptible in the environment, the output being adjusted in dependence on the monitoring data, the method further including providing data including at least one segment including data pertaining to a mental state to a terminal arranged to effect the adjustment in dependence on the monitoring data at least partly on the basis of the data pertaining to the mental state.

The method is suitable for implementation in a content authoring system, e.g. for providing data for broadcast or multicast. Alternatively, such a data stream can be provided on a data carrier such as a DVD or CD, in particular in combination with audiovisual data.

In an embodiment of the method, the data pertaining to at least one mental state includes data carrying information from which the dependency between the monitoring data and the output is at least partly derivable.

Thus, the terminal need be configured primarily to decode the data, but it need not previously have been programmed with every possible dependency between every conceivable mental state and the corresponding physiological and behavioral symptoms of users in such states.

In an embodiment of the method of influencing an environment of a terminal, the data pertaining to at least one mental state includes data representative of a boundary value of an allowable range of values of at least one signal obtainable from the monitoring data.

This data allows the entity carrying out the method to maximize or minimize certain monitored physiological or behavioral variables. The terminal provided with the data stream can thus be calibrated to ensure that any adjustments to its output that result in a change of mental state of a user remain within acceptable boundaries.

In an embodiment of the method of influencing an environment of a terminal, segments including data pertaining to at least one mental state are provided in synchrony with content data for rendering in at least one of a visible and an audible manner at the terminal.

Thus, the entity carrying out the method can provide an immersive experience at the location where the audiovisual content data is rendered.

In an embodiment of the method of influencing an environment of a terminal, at least one segment of data including data representative of aspects of the perceptible output to be adjusted is provided.

Thus, the entity carrying out the method can also influence the modality used to change the mental state of the persons in the environment of the terminal.

In a variant, the segments including the data representative of aspects of the perceptible output to be adjusted and the segments including the data pertaining to the at least one mental state are provided in an identifiably separate manner.

This allows a terminal to retrieve only one of the two types of segments. In particular, if a legacy terminal has no capability of processing monitoring data representative of physiological or behavioral symptoms of at least one user in the environment of the terminal, then only the data representative of the perceptible output to be adjusted can be retrieved and parsed.

According to another aspect, the system for influencing an environment of a terminal according to the invention is configured to provide data for delivery to the terminal, the terminal being arranged to receive monitoring data from a system for monitoring at least one user in the environment, wherein the terminal is further arranged to control at least one output device for providing an output perceptible in the environment, the output being adjusted in dependence on the monitoring data, and wherein the system is configured to provide data including at least one segment including data on the basis of which the terminal is able to adjust the output in dependence on the monitoring data.

According to another aspect, the signal according to the invention carries a data stream including at least one segment including data pertaining to a mental state, which data includes information on the basis of which a terminal arranged to control at least one output device for providing an output perceptible in an environment of the terminal is able to adjust the output in dependence on monitoring data provided by a system for monitoring at least one user in an environment of the terminal.

According to another aspect, the computer program according to the invention includes a set of instructions capable, when incorporated in a machine-readable medium, of causing a system having information processing capabilities to perform a method according to the invention.

BRIEF DESCRIPTION OF THE DRAWINGS

The invention will now be explained in further detail with reference to the accompanying drawings, in which.

DETAILED DESCRIPTION

Figure 1:
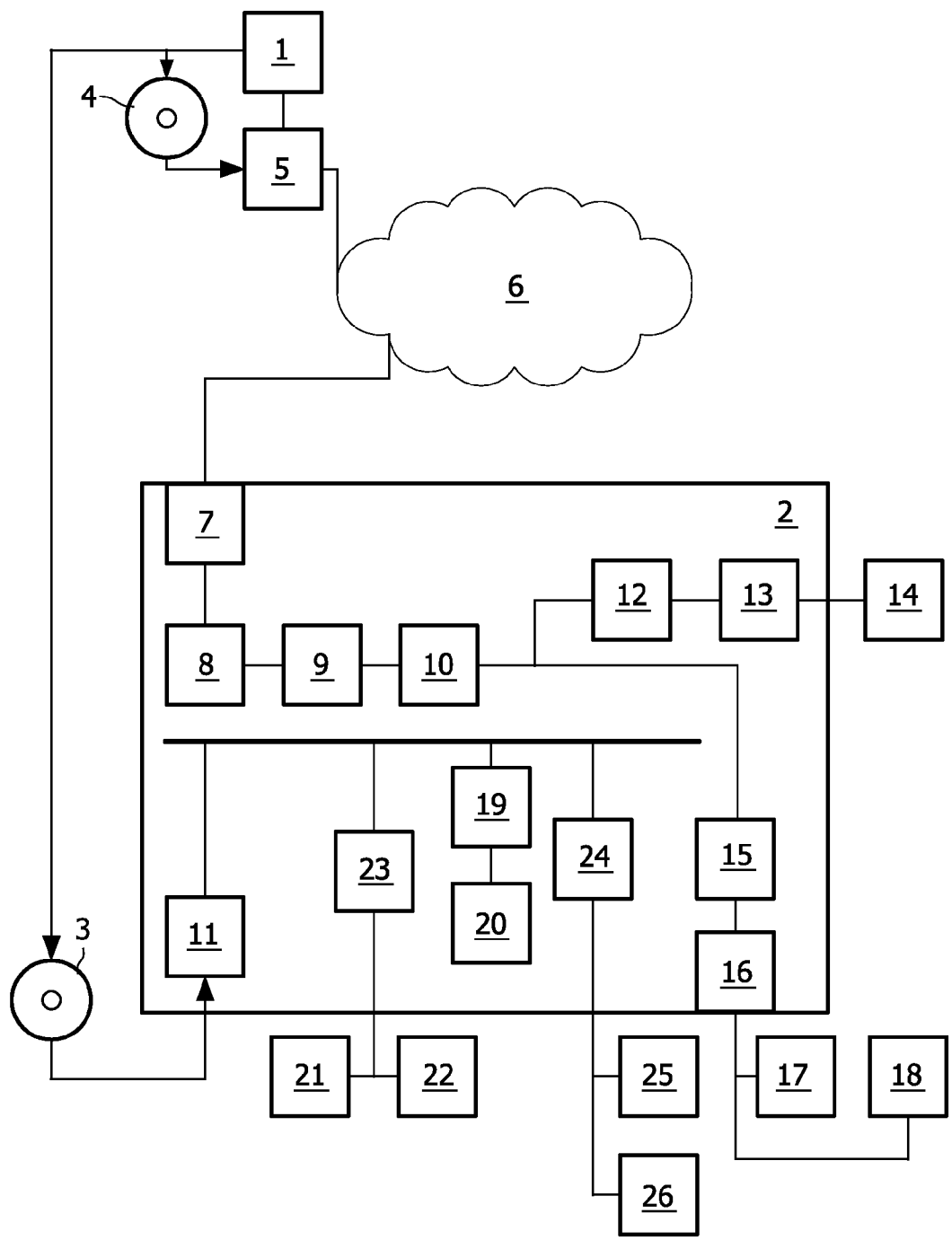
FIG. 1 is a diagram providing an overview of a system of distributing data for adapting an environment of a receiver decoder.

FIG. 1 illustrates in a schematic way an architecture for distributing data. In the following, the data will be taken to include at least one of audio, video and image data. The content data is provided in combination with time-varying emotion data. In certain embodiments, the emotion data is synchronized with the content data so that different mental states can be engendered in the persons accessing the content data at the appropriate times.

To provide the emotion data, an authoring system 1 is provided. The authoring system 1 is an example of a system for influencing an environment of a terminal 2 at which the content data is rendered in perceptible form. The terminal 2 can be implemented as a set-top box, personal computer, handheld computer, cellular telephone handset, digital television, etc. In one embodiment, the output of the authoring system 1 is provided on a data carrier 3, e.g. an optical disk, directly to the terminal 2. In another embodiment, it is provided on a data carrier 4 or via a network link to a server 5, which may be comprised in a broadcast network head-end, for distribution across a network 6 to the terminal 2 and other similar terminals. The network 6 can comprise a cellular network, a long-distance optical network, a satellite or cable television network, etc. Distribution may be in the form of a broadcast, multicast or direct transmission (e.g. download on demand to the terminal 2). In the illustrated embodiment, the content data is distributed in a digital television format, e.g. DVB or ATSC.

The terminal 2 receives the content data with the emotion data via a network interface 7, tuner 8, demodulator 9 and demultiplexer 10 in case of distribution via the network 6. The illustrated terminal 2 also comprises a read unit 11 for reading the contents of the data carrier 3.

In a known manner, the terminal 2 comprises a video codec 12, and display driver 13 for rendering the video component of a selected stream of content data on a display 14. An audio codec 15 and audio output stage 16 provides signals to loudspeakers 17,18.

Figure 3:
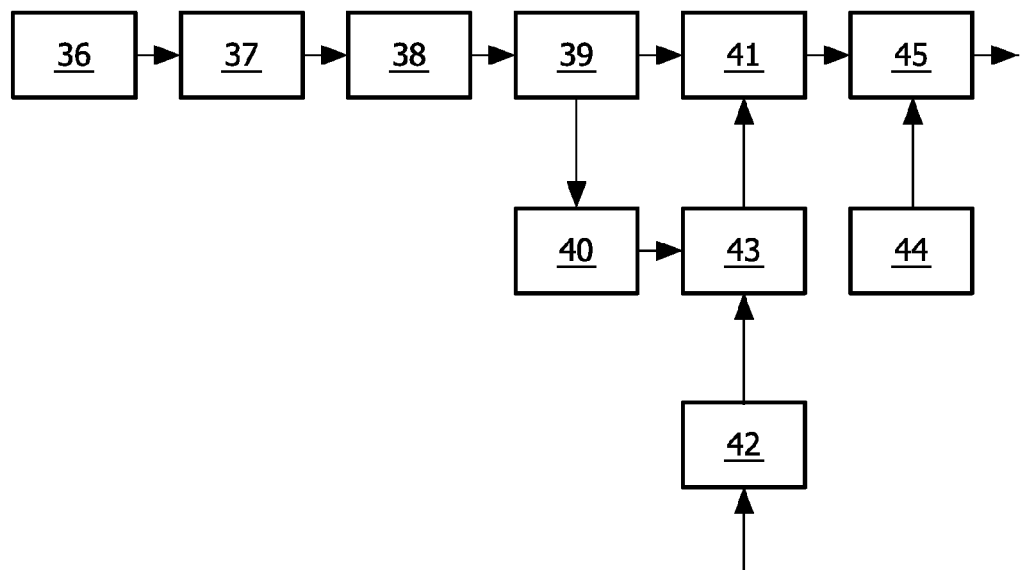
FIG. 3 is a block diagram of a decoder model for decoding the data for adapting the environment of the receiver decoder of FIG. 1.

The terminal 2 operates under the control of a processor 19 and main memory 20 for executing software, including instructions for parsing emotions data and implementing a decoder, a model of which is shown in FIG. 3. In addition, the terminal 2 is comprised in an ambient system further including ambient output devices 21,22 and a driver 23 therefor. The ambient output devices 21,22 are representative of a wide class of output devices for rendering perceptible output other than audio, video and image data. Examples include lighting devices for ambient lighting, in particular those arranged to provided directed light of adjustable color, intensity and direction, devices for influencing the ambient climate, e.g. temperature, humidity, and devices for providing tactile feedback, e.g. rumblers. The ambient output devices 21,22 can be worn on a user's person, e.g. comprised in a wrist-band, glove or head-set.

The terminal 2 also includes an interface 24 to monitoring devices 25,26, arranged to enable the terminal 2 to obtain monitoring data representative of at least one of physiological and behavioral symptoms exhibited by respective users of the terminal 2. Alternatively or additionally, the monitoring data may characterize the users collectively. The monitoring data includes data characterizing at least one of physiological and behavioral phenomena. Examples of the former include blood pressure, skin temperature, skin conductivity, heart rate, respiration rate and changes to these variables. Examples of the latter are generally characteristics of movement of the user or users, e.g. obtained by interpreting images taken with a digital camera. For example, facial expressions, the frequency of movement, the gaze direction and similar characteristics can be evaluated.

The monitoring data allows the terminal 2 to implement a form of closed-loop control of the mental state of the user or the users in the environment of the terminal 2. Thus, the mental state of the user is influenced to achieve a target mental state in accordance with the emotion data generated remotely on the authoring system 1.

Figure 2:
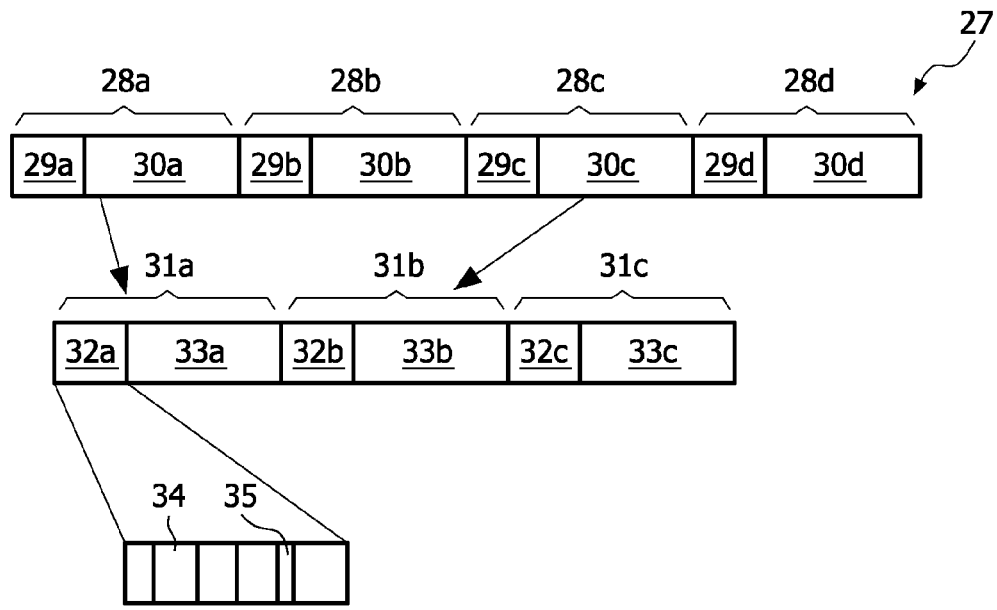
FIG. 2 is a schematic illustration of a packet-based data stream carrying the data for adapting the environment of the receiver decoder of FIG. 1.

FIG. 2 illustrates a data stream 27 in accordance with international standard ISO/IEC 13818-1 (MPEG-2 Systems) as an example of a data stream for carrying emotion data. The data stream 27 is comprised of transport stream packets 28a-d, each comprising a header 29a-d and a payload 30a-d of a fixed data length. The transport stream packets 28a-d carry Program Elementary Stream (PES) packets 31a-c, each also comprising a header 32a-c and a payload 33.

In the cases in which the emotion data is provided in synchrony with audio, video or audiovisual content data, the emotion data is part of a program. A program comprises a plurality of elementary streams. Each elementary stream is comprised of PES packets 31a-c which are separately identifiable by means of a stream identifier 34 in the PES packet header 32a. The PES packet header 32a includes further fields, which are not described here, except for a field 35 including a time stamp for determining at least one of a decode and presentation time relative to a clock reference carried in the data stream 27. Thus, synchronized rendering of the program components carried by the data stream 27 can be achieved.

Because any TS packet 28 carries data of one and only one elementary stream, a separate Packet Identifier (PID) in the TS packet header 29 also identifies the various elementary streams making up a program. Time stamps for synchronizing the elementary streams can in fact be included in the TS packet headers 29a-d, which in any case carry the clock reference.

As is described more fully in international standard ISO/IEC 13818-1, any data stream 27 made up of TS packets 28a-d comprises packets with a fixed identifier that carry data representative of a Program Association Table (PAT), not shown. This table identifies the available programs in the data stream 27, and points to the packets carrying a program map table (PMT). There is one such PMT for each program. The PMT identifies the packets carrying the different elementary streams, and their type. Depending on the embodiment, the PMT includes the PID of the TS packets 28a-d or the elementary stream identifiers of the PES packets 31a-c.

In the example used herein, the emotion data are carried in at least one separate elementary stream, each having its own respective identifier value, indicated in the PMT of the program to which it belongs. Where the emotion data is provided in synchrony with audio and video data, the PMT will identify the stream or streams carrying the audio data, the stream or streams carrying the video data and the stream or streams carrying the emotion data. The type of the stream or streams carrying emotion data will be "private", so that legacy terminals may ignore these streams. Thus, whereas in the terminal 2 of FIG. 1, the demultiplexer 10 is set to retrieve the emotion data, a legacy terminal would ignore them, and retrieve only those carrying the audio and video data.

FIG. 3 shows a decoder for a first embodiment of the terminal 2 for use in decoding emotion data carried in the data stream 27 and adjusting the output of at least the ambient output devices 21,22. The decoder is illustrated in terms of functional components, which may be implemented in a combination of hardware and software components in any of various ways.

The input to the decoder comprises the data stream 27 of FIG. 2. A packet filter 36 takes out only those TS packets 28a-d that comprise packet headers 29a-d with a certain PID value. These are the TS packets 28a-d carrying the emotion data. The packet filter 36 knows which PID values to look for from the PMT, which has been parsed previously, and which lists the PID values and associated descriptions of the elementary streams that form a program as explained above. The packet filter 36 is typically comprised in the demultiplexer 10 (FIG. 1).

In an embodiment of the method appropriate to the decoder model of FIG. 2, there are two types of data objects comprised in the emotion data, namely sensory scene description objects and emotion composition objects. In the following, the terms "object" and "segment" will be used interchangeably, segment being the term used to refer to objects embedded in a data stream.

The emotion composition objects comprise data pertaining to at least one mental state. This information informs the terminal of the target mental state to be achieved in the persons in the environment of the terminal 2.

The sensory scene description objects include data representative of aspects of the perceptible output of the ambient output devices 21,22 and, optionally, the display system and sound system comprised in the terminal and display 14 and loudspeakers 17,18, that are to be adjusted in order to influence the mental state of the users. That is to say that the sensory scene description object will specify whether a particular mental state is to be achieved by controlling the output of a tactile feedback device, the color temperature of lighting units, the sound level of the sound system, etc. The actual mental state to be achieved and the adjustments to be made to the selected output devices to achieve the mental state are specified in the emotion composition objects.

In the illustrated embodiment, the emotion composition objects and sensory scene description objects are identifiable as separate objects within a single elementary stream. In an alternative embodiment, the emotion composition objects and the sensory scene description objects are comprised in separate segments, each carried in a different respective elementary stream identifiable by a different respective PID value. Thus, a legacy decoder could ignore the emotion composition objects, merely using the sensory scene description objects to adjust the output of the ambient output devices 21,22. In that case, the sensory scene description objects would also include the level of the various types of output specified by them, e.g. the strength of the output of a fan or tactile feedback device, the color and intensity of light provided by ambient lighting devices etc. However, such a legacy decoder would not take into account the monitoring data obtained from the monitoring devices 25,26 when adjusting the output of the ambient system.

Returning to the decoder model, the TS packets 28a-d retrieved by the packet filter 36 are placed in a transport buffer 37. There, the packet headers 29a-d,32a-c are removed. The decoding time stamps and presentation time stamps are removed and associated with the emotion stream segments (sensory scene description segments and emotion composition segments). The segments are then placed in a coded data buffer 38.

An emotion stream processor 39 decodes and analyses the various segments of the emotion stream. Emotion composition segments are placed in an emotion command buffer 40 and sensory scene description segments are placed in a decoded sensory scene description object buffer 41.

As mentioned, the sensory scene description segments carry the data that describe how to change the ambience of the terminal 2, such as whether to change the lighting conditions, air flow, sound, smell, temperature or whether to provide tactile, audible or visible feedback. This data is generally encoded in a markup language. Examples of suitable data formats include MPEG-V, MPEG-RoSE or Ambi-X.

Emotion composition segments include any of three types of data, namely data describing a target mental state, emotion window definition data and interactive emotion composition data. The data will generally be in a markup language. It may include data in the W3C emotions markup language or MPEG-V format, extended to provide the functionality of the three types of emotion composition segment.

The emotion window definition data describes boundaries of the emotional state of the user. It is used as a calibration step, so that the user is not confronted with an undesired extreme sensory experience. Thus, this data includes data representative of at least one boundary value of an allowable range of values of at least one signal obtainable from the monitoring data received through the interface 24. The terminal 2 adjusts the output of the ambient output devices 21,22 so as to keep values of the signal obtainable from the monitoring data within the allowable range of values. In one embodiment, the signal obtainable from the monitoring data that is kept within an allowable range is a signal corresponding to a value of a variable characterizing the physiological or behavioral phenomena (blood pressure, heart rate, a measure of activity such as fidgeting, etc.). In another embodiment, the signal is a signal obtained by applying a model of a user to such a signal, in order to obtain a value or values of a variable corresponding to a dimension of a user's mental state (degree of arousal, degree of emotionality, degree of alertness, etc.).

The interactive emotion composition segments define how to react to a change in the measured emotional state of the user or collective of users. For example, it may define that if a user is feeling tense, the ambient lighting should change color. Indeed, it may define a function that relates the change in color to a change in a variable characterizing the tenseness of the user. Thus, the terminal 2 can derive a dependency between at least a sub-set of the monitoring data and the output to be provided by the ambient output devices 21,22.

Returning to the decoder model of FIG. 3, the signals from the monitoring devices 25,26 are processed by a monitoring signal processor 42 to obtain a signal for a sensory scene composition controller 43. The sensory scene composition controller uses the instructions in the emotion composition segments on how to respond to signals that are fed in in real-time from the monitoring signal processor 42. The sensory scene composition controller 43, based on the instructions in the emotion composition segments and the monitoring data, changes the decoded sensory scene description objects contained in the decoded sensory scene description object buffer 41. At this stage, it also ensures that the instructions in the emotion window definition data are observed.

The decoded sensory scene description objects that have been adjusted in this way move to a sensor scene description buffer 45. In the process, a sensory device capabilities mask 44 is applied. This mask 44 comprises data representative of capabilities of at least the terminal 2 or the output devices 12-18,21,22, controllable by the terminal 2, or both. The application of this mask 44 occurs at the final stage of the decoding process. Thus, the sensory scene description in the sensory scene description buffer 45, which contains the commands required to drive the output devices 12-18,21,22, always matches the capabilities of the available sensory rendering platform.

Figure 4:
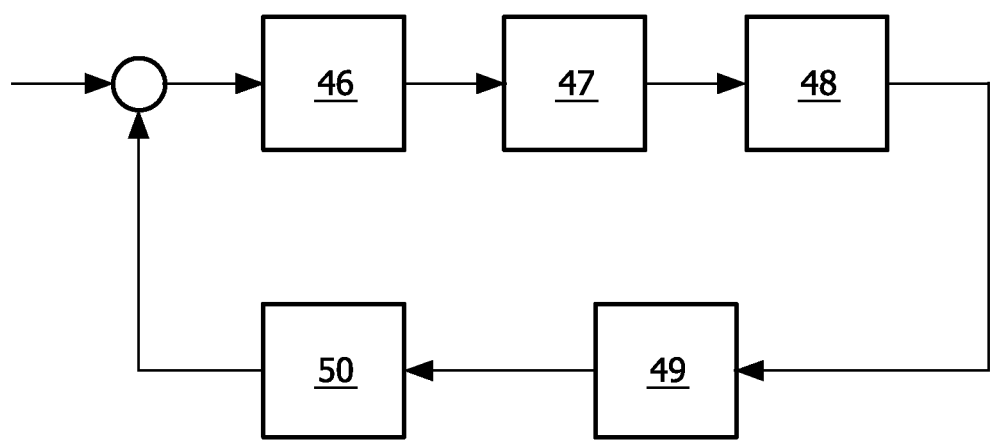
FIG. 4 is a block diagram describing in functional terms a further embodiment of a system for adapting the environment of a terminal.

FIG. 4 shows an alternative model of a system for adapting the environment of the terminal 2, also intended for implementation in the terminal 2. In this embodiment, the terminal 2 receives data pertaining to at least one mental state that includes at least the target mental state and, optionally, the manner in which the target mental state is to be achieved, e.g. in the form also of sensory scene description objects that describe which outputs to adjust and emotion scene composition objects that provide a model of a user in the form of functions describing how the mental state depends on monitoring data.

The system includes a controller 46, to be described in more detail further below. It also includes an actuation system 47 for providing output perceptible in the environment of the terminal 2. The actuation system 47 is embodied in the ambient output devices 21,22, in the processor 19, video codec 12, display driver 13 and display 14, and in the processor 19, audio codec 15, audio output stage 16, and loudspeakers 17,18, or in a sub-set of these devices, depending on the embodiment. They provide stimuli to which a human body 48 reacts. In particular, they provide stimuli of any one or more of the five senses (sight, smell, hearing, touch and taste).

A measurement system 49 provides monitoring data to a classifier/interpreter 50 representing a model of the human body 48. The classifier/interpreter 50 provides data representative of a mental state as output. This data is in the form of a set of values in N-dimensional space, wherein N≥1. Thus, it can be subtracted from the target mental state, which is in the same format. The difference signal is the input to the controller 46. The number N of dimensions can range from one to fifteen, in particular from one to three. Generally, there will be two dimensions, e.g. the valence and arousal dimensions of one widely used model of a person's emotional state. Higher values are useful when more intricate emotion models are used, for instance appraisal-based emotion descriptions.

In one embodiment, the terminal 2 is used to display images on the display 14. The perceptible output in this case is adjusted by selection of the source data for display (the picture). In this embodiment, the controller 46 is a discrete controller. In a similar embodiment, the terminal 2 selects scenes, switching between several alternative variants of a particular program. For example, there may be several elementary streams carrying video data, wherein the elementary streams each comprise a different variant of one story but different details and/or video settings. In a variant, the story truly forks and joins a single story line, in which case several audio streams with different dialogues are also provided. Alternatively, there can be one video stream but different audio streams, e.g. each with a different style of background music, with the controller 46 functioning to select the appropriate stream in dependence on the error signal.

In another embodiment, an overlay is provided on the display 14, the overlay covering only part of the area available for display of other content. In particular, an emoticon can be selected for display. In this embodiment, the controller 46 will generally be implemented in the form of a bang-bang controller. A bang-bang controller is a controller that switches between states, and has hysteresis.

In another embodiment, the controller 46 is a continuous controller, e.g. a PID, ID, P, D or I controller, which governs the settings of the output devices used to render pre-selected content or generally adjust the ambience of the terminal 2. Assuming that the terminal 2 is provided with a data stream 27 with embedded mental state targets, the terminal 2 will gradually adjust the immersiveness of the audiovisual content data consumption experience by selectively turning on and off or up and down settings such as audio volume, audio wideness, color saturation, color output of ambient lighting devices, etc.

Thus, a system along the lines of that shown in FIG. 4 is also capable of influencing the mental state of users of a terminal 2 in accordance with instructions generated using a remote authoring system 1 and conveyed to the terminal 2 in a data stream over a network 6 or on a data carrier 3.

It should be noted that the above-mentioned embodiments illustrate, rather than limit, the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

It will be appreciated that the emotion scene composition segments and sensory scene description segments can be stored as objects on the data carrier 3. The format of this data is compatible with that of data currently in use to provide sub-titles or graphics in data storage systems (DVD, Blu-Ray) and MPEG-related systems. Indeed, in another embodiment, the emotion data can be implemented as a graphics stream or sub-title stream and decoded by applying a firmware update to a conventional terminal 2. Alternatively, the sensory scene description objects can be described as image data and the emotion composition objects can be in the form of composition objects that provide annotations of the image data. A color lookup table can be applied to translate colors into commands for controlling an ambient output device 21,22.

The invention claimed is:

1. A method of adaptively affecting the emotional state of a user of a terminal controllably coupled to at least a first device for presenting content perceptible to the user and to at least a second device for modifying an ambient condition of an environment that is perceptible to the user, said method comprising:
   receiving from an external provider content data including information to be presented to the user and continually updatable emotion data including information relating to different predetermined emotions, corresponding to respective portions of the content data, to be elicited from the user;
   receiving monitoring data indicative of the user's emotional state; and
   controlling an output from at least one of the first and second devices to elicit said predetermined emotions from the user, the output being adjusted in dependence on the monitoring data indicative of the user's emotional state.

2. A method according to claim 1 where the emotion data comprises data including information from which the dependency between the monitoring data and the output is at least partly derivable.

3. A method according to claim 1 where the emotion data includes data representative of a boundary value of an allowable range of values of at least one signal obtainable from the monitoring data, and where the adjustment of the output is carried out so as to keep values of the signal obtainable from the monitoring data within the allowable range of values.

4. A method according to claim 1 where the emotion data is received in synchrony with the content data and where the adjustment of the output is synchronized with the presentation of the content.

5. A method according to claim 1 including:
   receiving at least one segment of data representative of aspects of the output to be adjusted; and
   modifying the data from said at least one segment to effect said adjustment in dependence on the monitoring data.

6. A method according to claim 5 where the data representative of aspects of the output to be adjusted is further modified on the basis of data representative of capabilities of at least one of the terminal and said first and second devices.

7. A method according to claim 5 including receiving segments of the data representative of aspects of the output to be adjusted and segments of the emotion data and separating the respective segments from each other.

8. A method according to claim 1 where the emotion data comprises respective, separately identifiable packets of a data stream including;
   emotion composition segments relating to the emotional state of the user, and sensory scene description segments describing predetermined outputs to be produced by the at least one of the first and second devices to elicit the predetermined emotions from the user;

where information from said emotion composition segments and from the monitoring data are collectively utilized to adjust said predetermined outputs.

9. A terminal for adaptively affecting the emotional state of a user including:

at least one interface for receiving:

from an external provider content data including information to be presented to the user and continually updatable emotion data including information relating to different predetermined emotions, corresponding to respective portions of the content data, to be elicited from the user; and monitoring data indicative of the user's emotional state;

a first driver for controllably coupling the terminal to at least a first output device for presenting content from the content data that is perceptible to said user;

a second driver for controllably coupling the terminal to at least a second output device for modifying an ambient condition of the environment that is perceptible to said user; and a processor configured to control the output from at least one of the first and second devices to elicit said predetermined emotions from the user and to adjust said at least one output in dependence on the monitoring data indicative of the user's emotional state.

10. A terminal according to claim 9 where the emotion data comprises respective, separately identifiable packets of a data stream including:

emotion composition segments relating to the emotional state of the user; and sensory scene description segments describing predetermined outputs to be produced by the at least one of the first and second drivers to elicit the predetermined emotions from the user;

said processor being configured to collectively utilize information from said emotion composition segments and from the monitoring data to adjust said predefined outputs.

11. A computer program embodied in a non-transitory machine-readable medium for effecting the performance of a method of adaptively affecting the emotional state of a user of a terminal controllably coupled to at least a first device for presenting content perceptible to the user and to at least a second device for modifying an ambient condition of an environment that is perceptible to the user, said method comprising;

receiving from an external provider content data including information to be presented to the user and continually updatable emotion data including information relating to different predetermined emotions, corresponding to respective portions of the content data, to be elicited from the user;

receiving monitoring data indicative of the user's emotional state; and controlling an output from at least one of the first and second devices to elicit said predetermined emotions from the user, the output being adjusted in dependence on the monitoring data indicative of the user's emotional state.

12. A method according to claim 8 where the emotion composition segments comprise:

target mental state data describing the predetermined emotions to be elicited from the user; and emotion window definition data describing boundaries of said predetermined emotions.

13. A method according to claim 12 where the emotion composition segments further comprise interactive emotion composition data describing how to react to a change in the monitored emotional state of the user.

* * * * *